United States Patent [19]
Faulkner et al.

[11] Patent Number: 5,259,196
[45] Date of Patent: Nov. 9, 1993

[54] INLET AIR COOLING SYSTEM

[75] Inventors: Henry B. Faulkner, Dover; Michael C. Swarden, Cambridge both of Mass.

[73] Assignee: Northern Research & Engineering Corp., Woburn, Mass.

[21] Appl. No.: 991,604

[22] Filed: Dec. 16, 1992

[51] Int. Cl.$^5$ ............................................. F02B 29/04
[52] U.S. Cl. ........................................ 60/599; 123/563
[58] Field of Search ........................... 60/599; 123/563

[56] References Cited

U.S. PATENT DOCUMENTS

| | | | |
|---|---|---|---|
| 2,298,214 | 10/1942 | Jones . | |
| 2,571,256 | 10/1951 | King . | |
| 3,306,032 | 2/1967 | Chaffiotte | 60/599 |
| 3,919,852 | 11/1975 | Jones | 62/7 |
| 4,015,438 | 4/1977 | Kinsell et al. | 62/88 |
| 4,441,326 | 4/1984 | Bernauer et al. | 62/7 |
| 5,081,977 | 1/1992 | Swenson | 123/563 |

FOREIGN PATENT DOCUMENTS

| | | | |
|---|---|---|---|
| 0050216 | 5/1981 | Japan | 60/599 |
| 622077 | 4/1949 | United Kingdom | 60/599 |

OTHER PUBLICATIONS

"Development of Combustion Air Refrigeration System Enabling Reliable Operation at 220 psi bmep for a Large Four-Cycle Spark-Ignited Gas Engine", ASME Pap. No. 66-DEGEP-7, Apr. 1965.

Primary Examiner—Richard A. Bertsch
Assistant Examiner—Charles G. Freay
Attorney, Agent, or Firm—Michael H. Minns

[57] ABSTRACT

An inlet air cooling system for natural gas compression. The system provides both inlet air refrigeration for the internal combustion engine and additional natural gas compression. Also provided is a leakage control system for any natural gas or hydrocarbon leakage from the combined cycle system. The leakage is collected and introduced into a low pressure portion of the engine air intake system where it is burned along with the normal engine fuel.

11 Claims, 2 Drawing Sheets

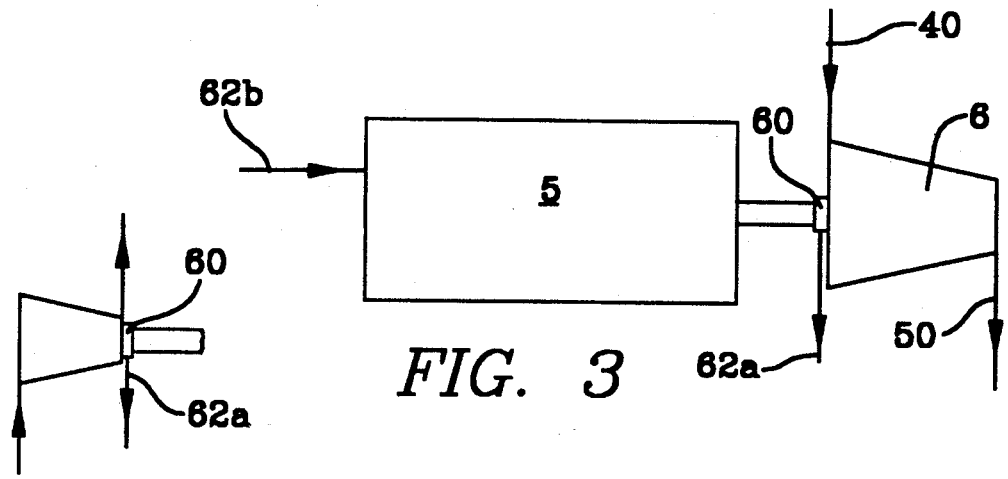
FIG. 2
FIG. 3
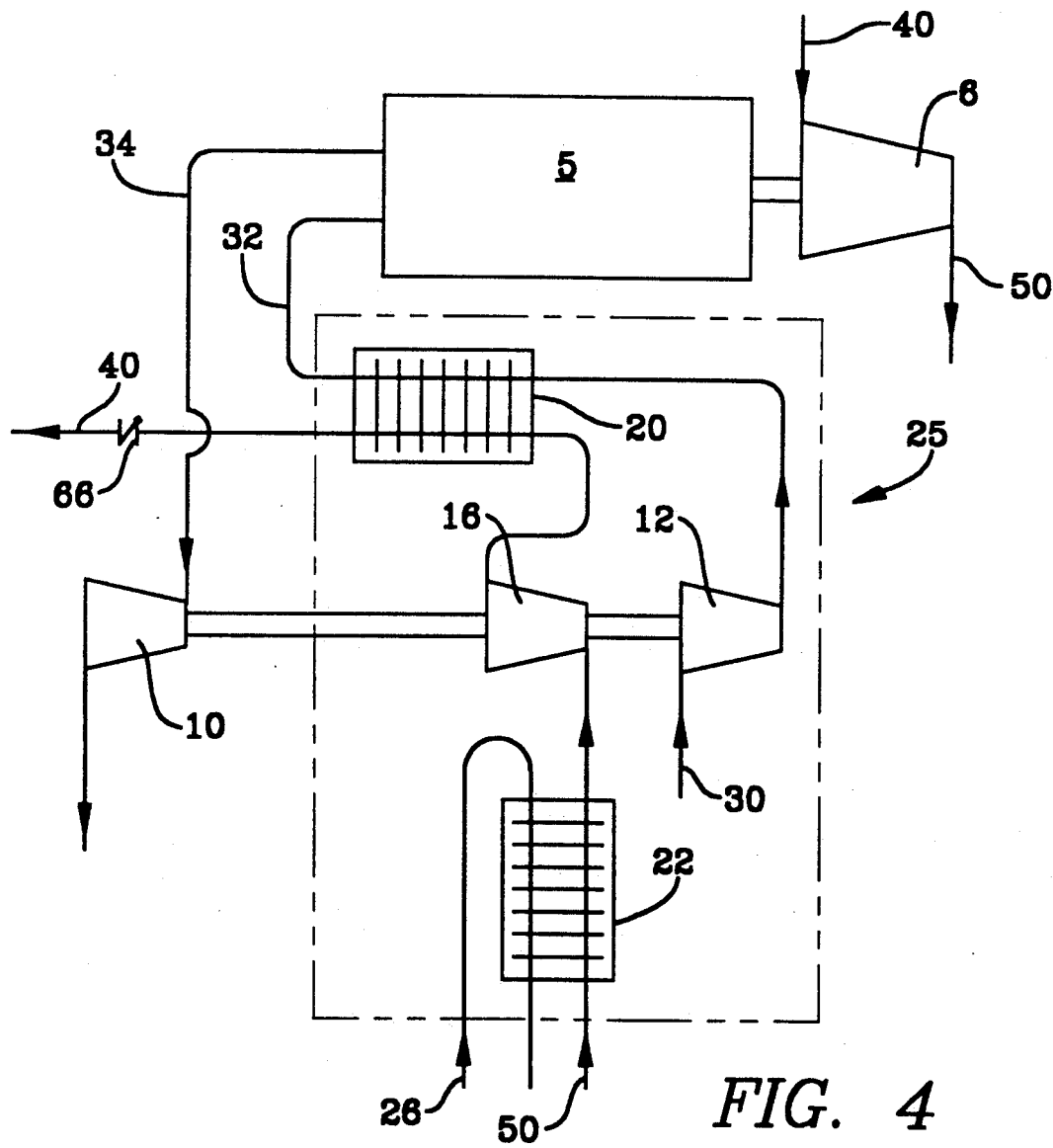
FIG. 4

INLET AIR COOLING SYSTEM

BACKGROUND OF THE INVENTION

This invention relates generally to an internal combustion engine inlet air cooling system and more particularly to an inlet air cooling system driven by an exhaust gas turbine of an engine.

It is conventional for supercharged or turbocharged engines to have a system for cooling the inlet air to approximately the temperature of the ambient air adjacent the engine. Otherwise, the inlet air would be at a higher temperature due to the heat of compression, which could result in poor engine operation. It is also recognized that engines benefit from the inlet air being cooled below the ambient air temperature. In particular, refrigeration below ambient can provide a combination of reduced specific $NO_x$ emissions, increased specific power and increased efficiency. The method most generally used for reducing specific $NO_x$ emissions, leaning the engine mixture, causes a reduction in specific power and may cause a loss of efficiency.

The foregoing illustrates limitations known to exist in present inlet air cooling systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an inlet air cooling means for cooling inlet air for an internal combustion engine, the inlet air cooling means being connected to an engine inlet air conduit, the inlet air cooling means using a hydrocarbon as a refrigerant, the inlet air cooling means including a hydrocarbon compression means for compressing the hydrocarbon.

The foregoing and other aspects will become apparent from the following detailed description of the invention when considered in conjunction with the accompanying drawing figures.

BRIEF DESCRIPTION OF THE DRAWING FIGURES

FIG. 2 is a schematic drawing showing the details of a hydrocarbon leakage collection system;

FIG. 3 is a schematic drawing of a second embodiment of a system incorporating the hydrocarbon leakage system; and FIG. 4 is a schematic drawing of an alternate embodiment of the system shown in FIG. 1.

DETAILED DESCRIPTION

Figure 1:
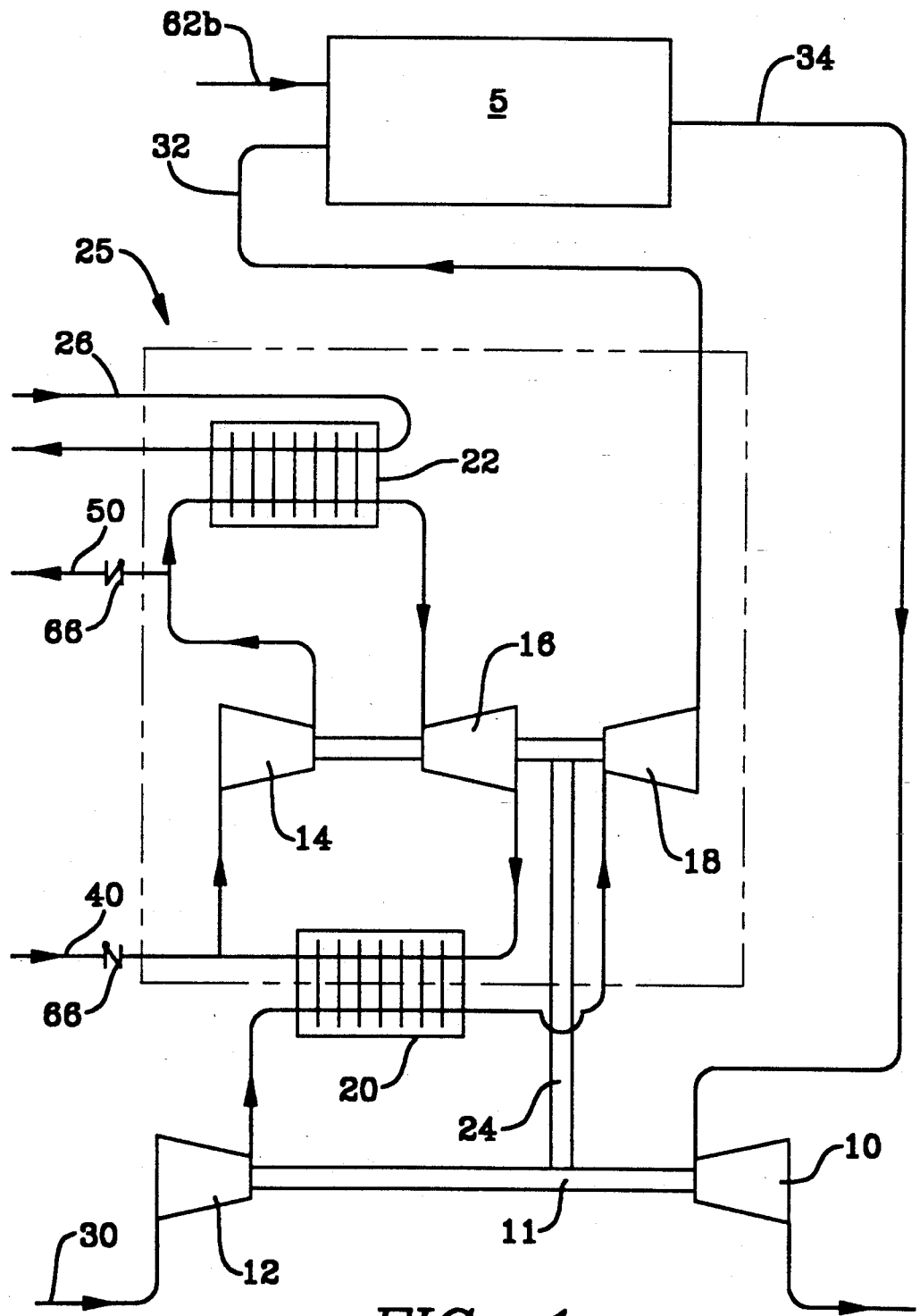
FIG. 1 is a schematic drawing of a system employing the concepts of this invention.

One embodiment of this invention, shown in FIG. 1, is a combined system for use on internal combustion engines in natural gas compression service. In the preferred embodiment, this combined cycle provides both inlet air refrigeration for the internal combustion engine and additional natural gas compression. Also provided is a leakage control system for any natural gas or hydrocarbon leakage from the combined cycle system. The leakage is collected and introduced into a low pressure portion of the engine air intake system where it is burned along with the normal engine fuel.

In the embodiment shown in FIG. 1, a combined cycle inlet air cooling system and gas compression system is shown. Natural gas is used as the refrigerant fluid. The natural gas refrigerant fluid circulates in a typical gas refrigeration cycle, transferring heat from the intake air to the ambient atmosphere, either directly or via an intermediate coolant, such as water. The natural gas compressor in the refrigerant circuit is oversized, and the refrigeration cycle is connected to the station high and low pressure gas mains. Therefore, this natural gas compressor augments the compression capacity provided by the internal combustion engine. The refrigeration system and the natural gas compressor receive power from the engine exhaust turbine and the refrigeration turbine. There may also be an additional turbine in the inlet stream to drop the inlet temperature further and provide additional power for the refrigeration system. The various compressors and turbines could be combined on a single shaft. The additional gas compression capacity assures that the maximum practical fraction of all the energy available in the exhaust system is utilized, without the use of additional components. The compressors and turbines may be of either the rotodynamic or positive displacement type.

The preferred embodiment also includes a hydrocarbon leakage control system. Recently, there has been greatly increased attention to minimizing the release of various gases into the atmosphere, including hydrocarbons. Inlet refrigeration systems require shaft seals which will inevitably leak slightly. However, for most refrigeration systems, the lowest pressure in the refrigeration system will be higher than the lowest pressure in the engine intake system. Therefore, any leakage can be arranged to flow into the engine intake, and then into the engine, to be burned along with the normal fuel. Normal leakage rates will not change the mixture ratio of the engine significantly. This hydrocarbon leakage control system is illustrated in FIGS. 1 and 2.

The hydrocarbon leakage control system may also be used with the normal engine compressor configuration typically used for natural gas compression service, as shown in FIG. 3.

The preferred embodiment of the system of this invention is shown schematically in FIG. 1 and includes an internal combustion engine 5 including an inlet air conduit 32 and an engine exhaust conduit 34. An exhaust gas turbine 10 is connected to the exhaust conduit 34 and is driven by the exhaust gas flowing from the engine 5.

A rotary inlet compressor 12 is connected to the inlet air conduit 32 for compressing the inlet air entering the inlet air conduit 32. Air is supplied to the inlet compressor 12 by an air conduit 30. This compressor, along with the other compressors and turbine expanders in this system may either be of the roto-dynamic type or of the positive displacement type. The preferred embodiment uses rotary compressors and turbine expanders. The inlet compressor 12 is mechanically driven by the exhaust turbine 10. As shown in FIG. 1, the inlet compressor 12 is connected to exhaust turbine 10 by direct drive shaft 11.

The compressed inlet air then flows through an inlet cooler 20 for extracting heat from the inlet air. Heat removal from the inlet air cooler 20 is provided by an inlet air cooling system 25. The inlet air cooling system 25 uses a hydrocarbon as a refrigerant. The preferred embodiment uses natural gas as the hydrocarbon refrigerant. The cooled compressed inlet air is then introduced into the engine intake system by inlet air conduit 32. If further cooling of the inlet air is desired, an inlet expander turbine 18 is provided to expand the compressed cooled inlet air, thereby further reducing the temperature. This optional inlet expander turbine 18 is mechanically connected to a gas compressor 14 and a refrigeration turbine 16, thus using some of the energy from the compressed inlet air to provide additional power for the inlet air cooling system 25. If the inlet expander turbine 18 is not provided, the power for the inlet air cooling system 25 is provided by the exhaust turbine 10 and the refrigeration turbine 16. The exhaust turbine 10 or the direct drive shaft 11 is mechanically connected to the inlet air cooling system by means such as shaft connection 24. The inlet air cooling system 25 can be driven by either the exhaust turbine 10 or the inlet expander turbine 18 or by both the exhaust turbine 10 and the inlet expander turbine 18.

The inlet air cooling system 25 is comprised of a gas compressor 14, a refrigeration turbine 16, the inlet cooler 20, a refrigeration cooler 22 and, if provided, the inlet expander turbine 18. The present invention is intended to be used in conjunction with a natural gas compression service. The source of the refrigerant, natural gas, is the station low pressure gas main 40. Typical station low pressure gas main pressures are 200 to 500 psi. Gas compressor 14 receives low pressure natural gas from the station low pressure gas main 40 and boosts the pressure to or above the pressure of the station high pressure gas main 50. Typical station high pressure gas main 50 pressures are 500 to 1200 psi. The heat of compression is removed from the compressed natural gas by the refrigeration cooler 22. The refrigeration cooler 22 is cooled by an outside source such as water or ambient air 26. The cooled compressed natural gas is then expanded in the refrigeration turbine 16, further reducing the natural gas temperature. The cooled low pressure natural gas then flows through the inlet cooler 20, removing the heat of compression from the compressed inlet air. The natural gas is then returned to the gas compressor 14.

Check valves 66 are provided in the station low pressure gas main 40 and the station high pressure gas main 50 to prevent backflow from the inlet air cooling system into the station low pressure gas main 40 and to prevent backflow from the station high pressure gas main 50 into the inlet air cooling system 25.

The preferred embodiment of the present invention uses a gas compressor 14 which is oversized and provides more natural gas compression than is required to cool the inlet air for the engine 5. The excess compressed natural gas is introduced into the station high pressure gas main 50. This system, therefore, uses some of the exhaust gas pressure from the engine 5 to provide additional natural gas compression.

FIG. 2 illustrates an embodiment of a gas leakage collection system. Although FIG. 2 shows a single compressor, the gas leakage collection system is connected to many potential leakage sources. At any point in the inlet air cooling system 25 where significant natural gas leakage may occur, such as a shaft seal, a controlled leakage seal 60 is used. The controlled leakage seal 60 collects the natural gas which may leak past a shaft seal and directs the leakage to a controlled leakage collection system 62a, 62b. FIG. 2 shows the portion of the controlled leakage collection system 62a connected to the controlled leakage seal 60 There may be multiple portions of the controlled leakage system 62a, each being connected to a different controlled leakage seal 60. The portions 62a of the controlled leakage system are brought together to a single point 62b which is connected to a low pressure portion of the engine intake system. Depending upon the relative pressures, the controlled leakage system 62b may be connected to the inlet air conduit 32 or may be connected to another portion of the engine intake system.

In most refrigeration systems, the lowest pressure in the refrigeration cycle will be higher than the lowest pressure in the engine intake system. This controlled leakage collection system is arranged to cause any leakage to flow into the engine intake. By using this controlled leakage collection system, any natural gas leakage is collected and then burned in the engine along with the normal engine fuel. Normal leakage rates will not change the mixture ratio of the engine significantly. Although this system is shown in combination with a natural gas inlet air refrigeration system, it can be used with any refrigeration system which uses a refrigerant which can be burned in the engine.

An alternate embodiment of the controlled leakage collection system is shown in FIG. 3. The engine 5 and the station compressor 6 are typical natural gas compression service components. The controlled leakage collection system 62a, 62b is used to collect any natural gas leakage from the compressor 6. The leakage is introduced into the engine intake system as discussed above.

FIG. 4 shows an alternate embodiment of an inlet air cooling system for use with an internal combustion engine. The primary difference between the alternate embodiment and the embodiment shown in FIG. 1 is the alternate embodiment does not contain a separate compressor for compressing the natural gas refrigerant.

High pressure natural gas is supplied to the inlet air cooling system 25 by the station high pressure gas main 50. The high pressure natural gas is cooled in refrigeration cooler 22, which is in turn cooled by either water or air 26. The cooled high pressure natural gas is then expanded in refrigeration turbine 16, further reducing the natural gas temperature.

Inlet air for the engine 5 is compressed by an inlet compressor 12 and then cooled in inlet cooler 20. The cooled expanded natural gas is used to remove the heat of compression from the compressed inlet air. The inlet compressor 12 is mechanically connected to the refrigeration turbine 16, which drives the inlet compressor 12. The natural gas is returned to the station low pressure gas main 40 after cooling the compressed inlet air.

An exhaust turbine 10 may also be used to provide additional power to the inlet compressor 12. The exhaust turbine is connected to the engine exhaust conduit 34 to be driven by the engine exhaust. The exhaust turbine is also mechanically connected to the inlet compressor 12.

Having described the invention, what is claimed is:

1. In combination:
   an internal combustion engine having inlet air and exhaust gas conduits and an intake system; and
   an inlet air cooling means for cooling inlet air connected to the inlet air conduit, the inlet air cooling means using a hydrocarbon as a refrigerant, the inlet air cooling means including a hydrocarbon compression means for compressing the hydrocarbon, the hydrocarbon compression means having a capacity in excess of the capacity necessary to provide the inlet air cooling, the excess capacity being used to compress a portion of the hydrocarbon for introduction into a high pressure gas main.

2. The combination of claim 1, further comprising a means for collecting hydrocarbon leakage, the collected hydrocarbon leakage being introduced into a hydrocarbon conduit connected to a low pressure portion of the engine intake system, this portion of the engine intake system having a pressure lower than the pressure in the hydrocarbon conduit, thereby causing the collected hydrocarbon leakage to flow into the engine intake system.

3. In combination:
   an internal combustion engine having inlet air and exhaust gas conduits and an intake system;
   an exhaust turbine connected to the exhaust gas conduit and driven by exhaust gas flowing from the engine;
   an inlet compressor for compressing inlet air, the inlet compressor being driven by the exhaust turbine;
   an inlet cooler for cooling the compressed inlet air;
   a gas compressor for compressing a hydrocarbon, the gas compressor having a capacity in excess of the capacity necessary to provide hydrocarbon to the inlet cooler, the excess capacity being used to compress a portion of the hydrocarbon for introduction into a high pressure gas main;
   a gas cooler for cooling the compressed hydrocarbon; and
   a refrigeration turbine for expanding the compressed hydrocarbon after the compressed hydrocarbon has been cooled, the expanded hydrocarbon providing cooling to the inlet cooler, the refrigeration turbine being mechanically connected to the gas compressor.

4. The combination of claim 3, wherein the gas compressor is driven by the exhaust turbine.

5. The combination of claim 3, further comprising a means for collecting hydrocarbon leakage, the collected hydrocarbon leakage being introduced into a hydrocarbon conduit connected to a low pressure portion of the engine intake system, this portion of the engine intake system having a pressure lower than the pressure in the hydrocarbon conduit, thereby causing the collected hydrocarbon leakage to flow into the engine intake system.

6. In combination:
   an internal combustion engine having inlet air and exhaust gas conduits and an intake system;
   an exhaust turbine connected to the exhaust gas conduit and driven by exhaust gas flowing from the engine;
   an inlet compressor for compressing inlet air, the inlet compressor being driven by the exhaust turbine;
   an inlet cooler for cooling the compressed inlet air;
   a gas compressor for compressing a hydrocarbon;
   a gas cooler for cooling the compressed hydrocarbon;
   a refrigeration turbine for expanding the compressed hydrocarbon after the compressed hydrocarbon has been cooled, the expanded hydrocarbon providing cooling to the inlet cooler, the refrigeration turbine being mechanically connected to the gas compressor; and
   an inlet turbine, the inlet turbine being driven by the compressed inlet air, the inlet turbine being mechanically connected to the refrigeration turbine and the gas compressor.

7. In combination:
   an internal combustion engine having inlet air and exhaust gas conduits;
   an exhaust turbine connected to the exhaust gas conduit and driven by exhaust gas flowing from the engine;
   an inlet compressor for compressing inlet air, the inlet compressor being driven by the exhaust turbine;
   an inlet cooler for cooling the compressed inlet air;
   a gas compressor for compressing a hydrocarbon, the compressed hydrocarbon being divided into at least two portions;
   a gas cooler for cooling the compressed hydrocarbon; and
   a refrigeration turbine for expanding a first portion of the compressed hydrocarbon after the compressed hydrocarbon has been cooled, the expanded hydrocarbon providing cooling to the inlet cooler, the refrigeration turbine being mechanically connected to the gas compressor, a second portion of the compressed hydrocarbon being introduced into a high pressure gas main.

8. The combination of claim 7, further comprising an inlet turbine, the inlet turbine being driven by the compressed inlet air, the inlet turbine being mechanically connected to the refrigeration turbine and the gas compressor.

9. The combination of claim 7, wherein the gas compressor is driven by the exhaust turbine.

10. The combination of claim 7, further comprising:
    an inlet turbine, the inlet turbine being driven by the compressed inlet air, the inlet turbine being mechanically connected to the refrigeration turbine and the gas compressor, the gas compressor further being driven by the exhaust turbine.

11. A combination of claim 7, further comprising a means for collecting hydrocarbon leakage, the collected hydrocarbon leakage being introduced into a hydrocarbon conduit connected to a low pressure portion of the engine intake system, this portion of the engine intake system having a pressure lower than the pressure in the hydrocarbon conduit, thereby causing the collected hydrocarbon leakage to flow into the engine intake system.

* * * * *